June 15, 1965
R. T. BURNETT
3,189,129
BRAKE SHOE RETAINER
Filed Oct. 4, 1962
3 Sheets-Sheet 1
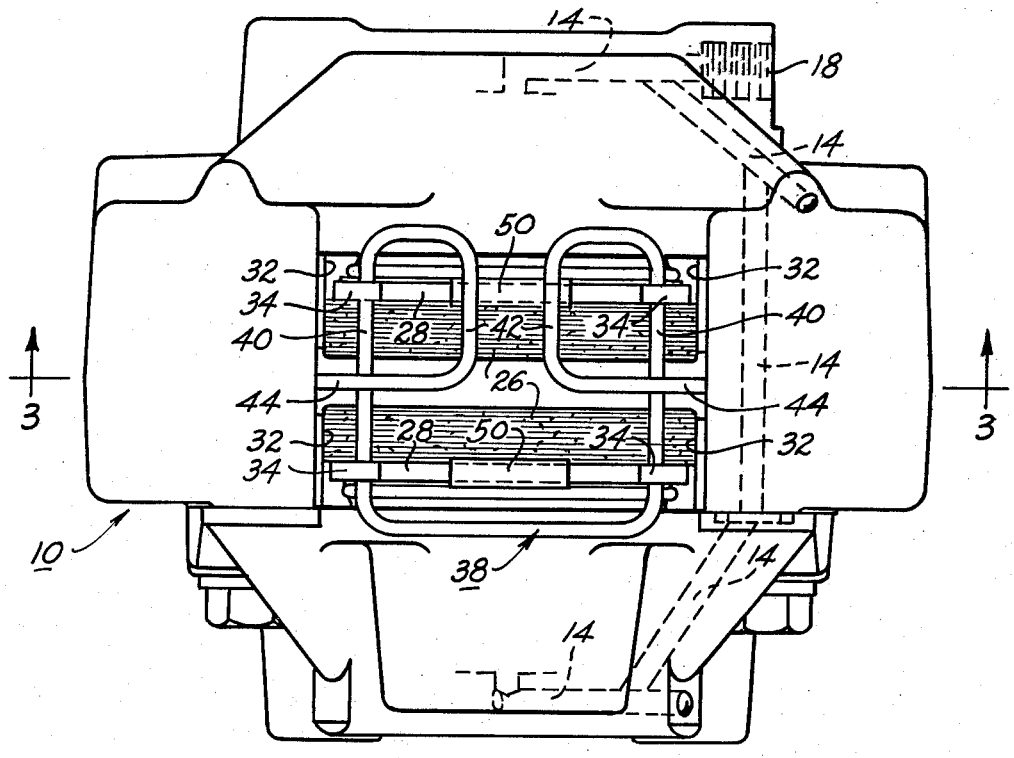
FIG_1
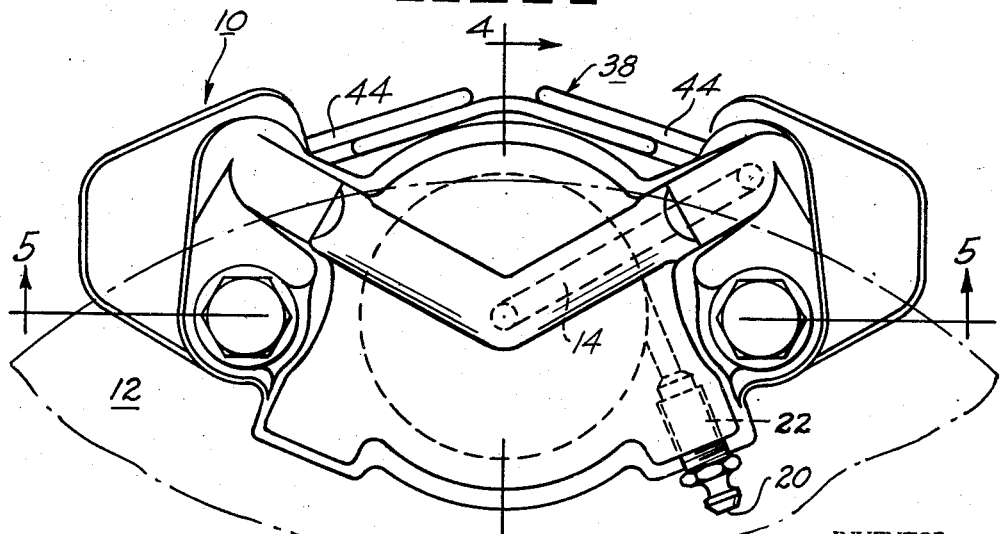
FIG_2
INVENTOR.
RICHARD T. BURNETT.
BY
Sheldon F. Rojes
ATTORNEY.

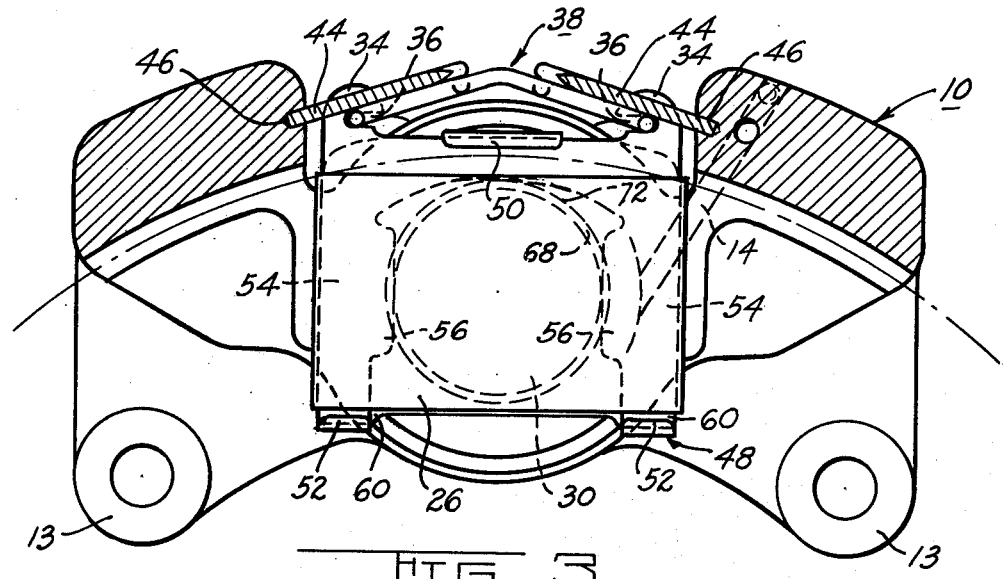
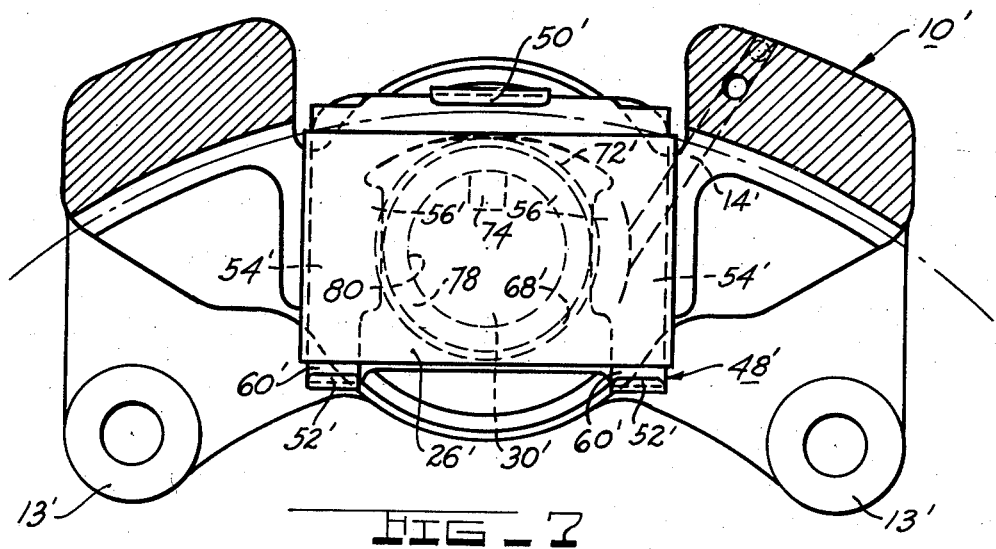

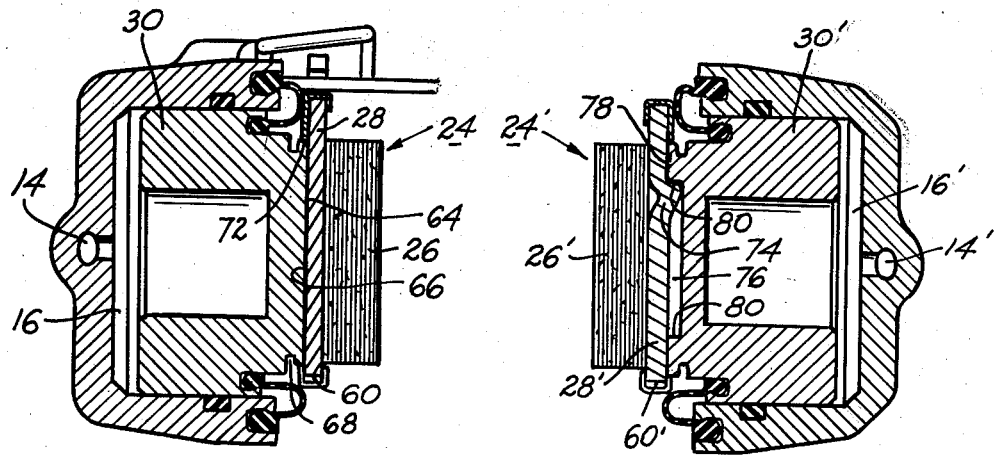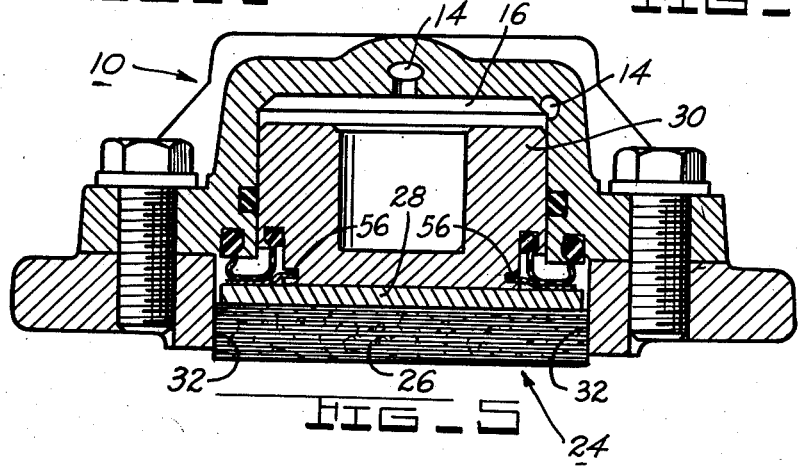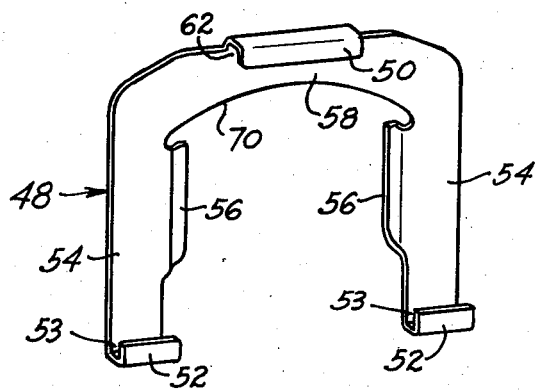

United States Patent Office 3,189,129
Patented June 15, 1965

3,189,129
BRAKE SHOE RETAINER
Richard T. Burnett, South Bend, Ind., assignor to The Bendix Corporation, South Bend, Ind., a corporation of Delaware
Filed Oct. 4, 1962, Ser. No. 228,346
8 Claims. (Cl. 188—73)

This invention relates to a construction for attaching a disk brake shoe to a piston.

One of the objects of this invention is to provide a brake shoe with a member for attaching the shoe to a piston.

Many constructions have been proposed to permit withdrawal of disk brake shoes, which are attached to pistons, from a brake without disturbing the actuating mechanism. The above constructions known to the applicant includes a retainer element attached to a brake housing which serves the purpose of preventing outward movement of the brake shoe during brake application or if the brake is mounted in such a position to cause such movement. The removal of the retainer element is necessary prior to removal of the brake shoe. Such an arrangement has its drawbacks.

Accordingly, it is another object of this invention to provide a connection between a brake shoe and a piston which does not necessitate the use of additional elements to prevent outward movement away from the brake no matter in what position the brake may be.

Other objects will become apparent to those skilled in the art from the following description with reference to the accompanying drawings which depicts several embodiments of the invention for illustrative purposes only.

In the drawings:

FIGURE 1 is a plan view of a disk brake;
FIGURE 2 is a front elevational view of FIGURE 1;
FIGURE 3 is a view taken along section line 3—3 of FIGURE 1;
FIGURE 4 is a partial view taken along section line 4—4 of FIGURE 2;
FIGURE 5 is a partial view taken along section line 5—5 of FIGURE 2;
FIGURE 6 is an isometric view of a retainer clip;
FIGURE 7 is a view similar to FIGURE 3 only of a modified embodiment; and
FIGURE 8 is a view similar to FIGURE 4 only of the modified embodiment of FIGURE 7.

Referring first to FIGURES 1 and 2, there is shown a stationary caliper housing 10 straddling a rotor 12. A pair of ears 13 (FIGURE 3) extending from the caliper housing on one side of the rotor are mounted to a stationary part of a vehicle, such as a spindle or axle flange (not shown). The housing contains passageways 14 for communicating the fluid chambers 16 of the brake with an outside pressure source such as a master cylinder (not shown). An inlet port 18 is connected to the pressure source and a bleeder screw 20 is inserted in a bleeder port 22 for bleeding the fluid system of the brake.

A pair of brake shoes 24 comprising a block of friction lining 26 bonded to the front face of a backing plate 28 are releasably connected to pistons 30 for movement therewith. The connection of the brake shoes to the pistons, to which the invention relates, will be described in detail hereinafter.

Each shoe is located between a pair of circumferentially spaced anchoring and guiding ledges 32. Each backing plate 28 has a pair of circumferentially spaced ears 34 each having a groove 36 therein for receiving a resilient retaining wire 38. The wire is generally U-shaped with the legs 40 extending through the grooves 36. The ends of the legs 40 are reversely curved at 42 to cross over the legs 40 and has a portion 44 snapped into an opening 46 of the caliper housing 10. This wire prevents movement of the brake shoes outwardly from the caliper housing either during brake application or if the caliper is mounted in such a position to cause such movement. Upon squeezing the resilient end portions 44 toward each other, the end portions will slip out of the openings 46 and the resilient wire 38 can be removed to allow the withdrawal of the brake shoes 24 from the caliper housing for replacement.

Referring now to FIGURES 3, 4, 5 and 6, there is illustrated the connecting means for releasably securing the brake shoe 24 to the piston. Only the cylinder housing on one side of the rotor is shown in FIGURES 4 and 5 since the views are the same on each side of the rotor and are not necessary to a complete understanding of the invention. A resilient retainer clip 48 has a tab 50 at its upper edge and a pair of tabs 52 at the lower edges of the legs 54 and forming grooves 53 therebetween. Each leg has a flange 56 bent away from the plane of the legs 54 and the bridge portion 58 interconnecting the legs 54. The backing plate 28 has a pair of ears 60 extending therefrom and are slidably received within the grooves 53 and a portion of the upper edge of the backing plate is slidably received in the groove 62 formed between the tab 50 and the bridge portion 58. The clip is bowed to provide enough engagement between various portions of the clip 48 and the backing plate to retain the clip 48 on the backing plate when the shoe is not assembled to the piston.

The piston 30 has a face 64 engaging the rear face 66 of the backing plate. An annular groove 68 is axially spaced from the face 64 and slidably receives the flanges 56 therein until the edge 70 engages the peripheral edge 72 of the piston between the groove 68 and the face 64. Obviously, if desired, a flange similar to flanges 56 could extend from the bridge portion 58 and extend within the groove 68.

The edge 70 of the resilient retainer clip prevents the shoe from moving in a direction vertically downwardly or in a direction toward the location of the open end of the clip 48 between the tabs 52 when the clip and brake shoe are secured to the piston in their normal positions. The brake shoe and clip are removable from the piston in a direction parallel to the rotor upon removal of the retainer wire 38 from the caliper.

Referring to FIGURES 7 and 8, there is shown a modification with the same structure as shown in the previous modification being designated with the same reference numerals with primes (') affixed thereto.

The backing plate 28' is upset at 74 to form a detent and a recess 76 is formed in the piston 30 for receiving the detent 74 therein. The retainer clip 48' is the same configuration as the clip 48 and slides on the backing plate 28' in the same manner as the clip 48 slides on the backing plate 28. When the shoe 24 is attached to the piston, the flanges 56' are slid in the groove 68' of the piston. Since the flanges 56' and the rest of the retainer clip are resilient, the detent 74 will ride on the surface 78 of the piston and then be biased or snapped into the recess 76 by the resilient clip 48' as it passes a portion of the annular shoulder 80. The brake shoe is now prevented by engagement of the detent 74 with the shoulder 80 from movement in a direction vertically upwards or away from the location of the opening of the clip 48' between the tabs 52' when the brake shoe and retainer clip are in their normal attached position to the piston. Thus, the retainer wire 38 and the backing plate ears 34 of the previous embodiment can be dispensed with. Obviously, there may be many variations of the recess 76 as, for instance, a recess the size of the detent may be provided.

While this invention has been described with respect to specific embodiments, I do not intend to be limited thereby, but I intend to include all modifications covered by the scope of the following claims which would be obvious to those skilled in the art.

I claim:

1. In a disk brake: a rotor having friction surfaces thereon, a housing having a bore, a piston slidable in said bore toward and away from said rotor friction surfaces, a brake shoe comprising a backing plate with friction lining affixed to the front face thereof, said backing plate having portions extending beyond the radially inner and radially outer peripheral edges of said lining, a generally flat U-shaped resilient member, a plurality of tabs attached to said resilient member and spaced from one face thereof to form grooves, said backing plate portions being received within said grooves for securing said resilient member to said brake shoe, said one face of said resilient member engaging the rear face of said backing plate and exposing the portion of said rear face of said backing plate between the legs of said U-shaped member, flange means attached to said legs overlying a portion of said exposed portion of said rear face of said backing plate and spaced therefrom, said piston having an annular groove spaced from its front face, said flange means being disposed within said annular groove, said piston front face engaging the exposed rear face of said backing plate.

2. The structure as recited in claim 1 wherein said U-shaped resilient member opens at the radial inner end thereof adjacent the radial inner edge of said backing plate and the closed end of said resilient U-shaped member joining said legs engages the annular edge of said piston located between the front face thereof and said annular groove to prevent radial inward movement of said shoe, said tabs being attached to the free end of each leg and the radial outer edge of said U-shaped resilient member.

3. The structure as recited in claim 2 further comprising a detent extending from the exposed portion of said backing plate, an opening in said piston front face, said detent being received within said opening to prevent radial outward movement of said brake shoe.

4. The structure as recited in claim 2 further comprising cooperating means on said piston face and said exposed portion of said backing plate for preventing radial outward movement of said brake shoe.

5. The structure as recited in claim 4 wherein said cooperating means comprises an opening and a detent extending into said opening.

6. A brake shoe for a disk brake comprising: a backing plate with friction lining affixed to the front face thereof, said backing plate having portions extending beyond the radially inner and radially outer peripheral edges of said lining, a generally flat U-shaped resilient member, a plurality of tabs attached to said resilient member and spaced from one face thereof to form grooves, said backing plate portions being received within said grooves for securing said resilient member to said brake shoe, said one face of said resilient member engaging the rear face of said backing plate and exposing the portion of said rear face of said backing plate between the legs of said U-shaped member, flange means attached to said legs overlying a portion of said exposed portion of said rear face of said backing plate and spaced therefrom.

7. The structure as recited in claim 6 wherein said U-shaped resilient member opens at the radial inner end thereof adjacent the radial inner edge of said backing plate, said tabs being attached to the free end of each leg and the radial outer edge of said U-shaped resilient member.

8. The structure as recited in claim 7 further comprising a detent extending from the exposed portion of said backing plate.

References Cited by the Examiner

UNITED STATES PATENTS

| 692,512 | 2/02 | Maloon | 292—87 |
|---|---|---|---|
| 2,761,188 | 9/56 | Bedford | 24—213 X |
| 2,885,925 | 5/59 | La Vezzi | 24—230 X |
| 2,952,343 | 9/60 | Modrey | 24—213 X |
| 3,042,152 | 7/62 | Butler | 188—73 |

FOREIGN PATENTS 1,251,443  12/60  France.

EUGENE G. BOTZ, *Primary Examiner.*

ARTHUR L. LA POINT, *Examiner.*